(12) United States Patent
Leonard

(10) Patent No.: US 7,534,817 B1
(45) Date of Patent: May 19, 2009

(54) KOMBIC ACID/SARGANOL BIS-SUCCINATE AND DERIVATIVES AS POTENT APOPTOGENS (ANTINEOPLASTIC AGENTS) WITH HIGH SELECTIVITY FOR CANCER CELLS

(76) Inventor: Edward C. Leonard, 5050 Poplar Ave., Suite 1435, Memphis, TN (US) 38157

( * ) Notice: Subject to any disclaimer, the term of this patent is extended or adjusted under 35 U.S.C. 154(b) by 341 days.

(21) Appl. No.: 11/469,661

(22) Filed: Sep. 1, 2006

Related U.S. Application Data

(63) Continuation-in-part of application No. 10/780,052, filed on Feb. 17, 2004, now Pat. No. 7,223,877, which is a continuation-in-part of application No. 10/301,119, filed on Nov. 21, 2002, now Pat. No. 6,713,512, which is a continuation-in-part of application No. 09/910,152, filed on Jul. 19, 2001, now Pat. No. 6,489,494.

(51) Int. Cl.
*A61K 31/20* (2006.01)

(52) U.S. Cl. .................................. 514/559; 554/218

(58) Field of Classification Search ....................... None
See application file for complete search history.

(56) References Cited

U.S. PATENT DOCUMENTS 5,674,900 A 10/1997 Ubillas et al.
6,489,494 B1 12/2002 Leonard
6,692,762 B2 2/2004 Cain et al.

OTHER PUBLICATIONS

Lok, C.M., Groenewegen, A., Stroink, B.A., and Ward, J.P., Phytochemistry, vol. 22, No. 9, pp. 1973-1976, 1983.

*Primary Examiner*—Deborah D Carr
(74) *Attorney, Agent, or Firm*—H. Roy Berkenstock; Wyatt, Tarrant & Combs, LLP

(57) ABSTRACT

This invention provides sarganol bis-succinate and alkyl and aryl derivatives thereof as potent apoptogens (antineoplastic agents) with high selectivity for cancer cells.

10 Claims, 3 Drawing Sheets

The Initial Structural Characterization of Kombic Acid

Figure 1: The Initial Structural Characterization of Kombic Acid
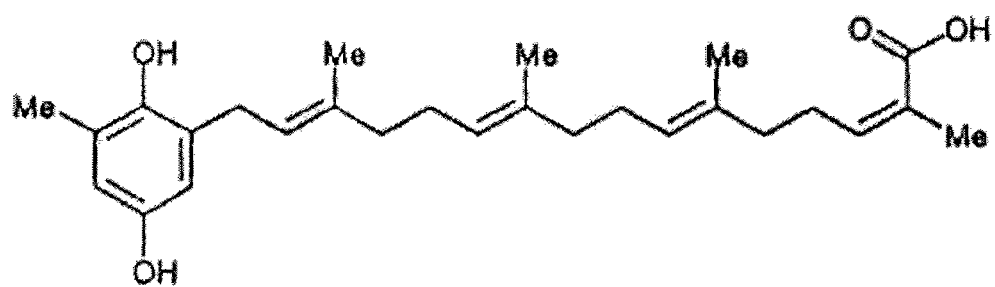
Figure 2: The Structure of Sargahydroquinoic acid (SHQA) or Sarganol:
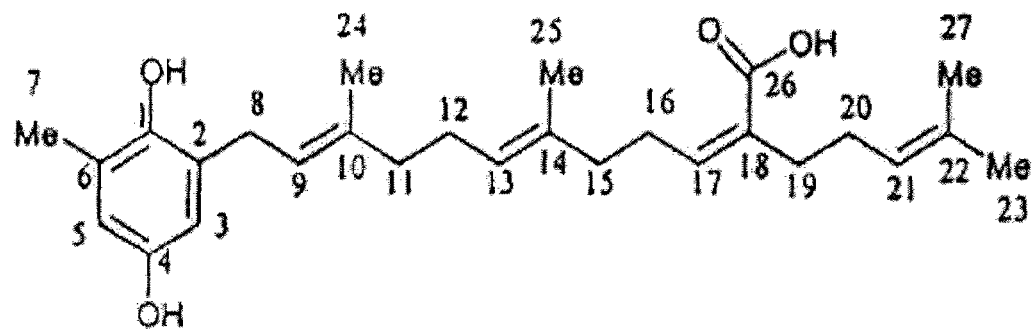

Figure 3: Bis-Succinate Derivatives of Sarganol:
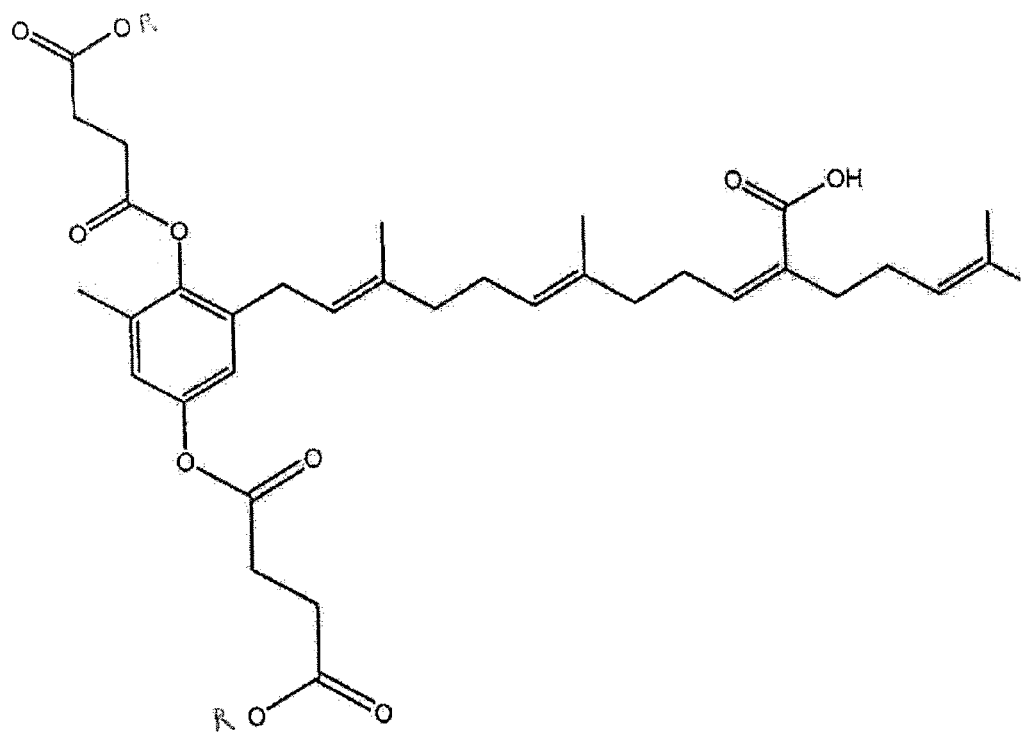
where R can be H, an alkyl group, or an aryl group to yield sarganol, alkyl ester derivatives, or aryl ester derivatives respectively.

Figure 4: Succinate Amide Ester Derivatives:
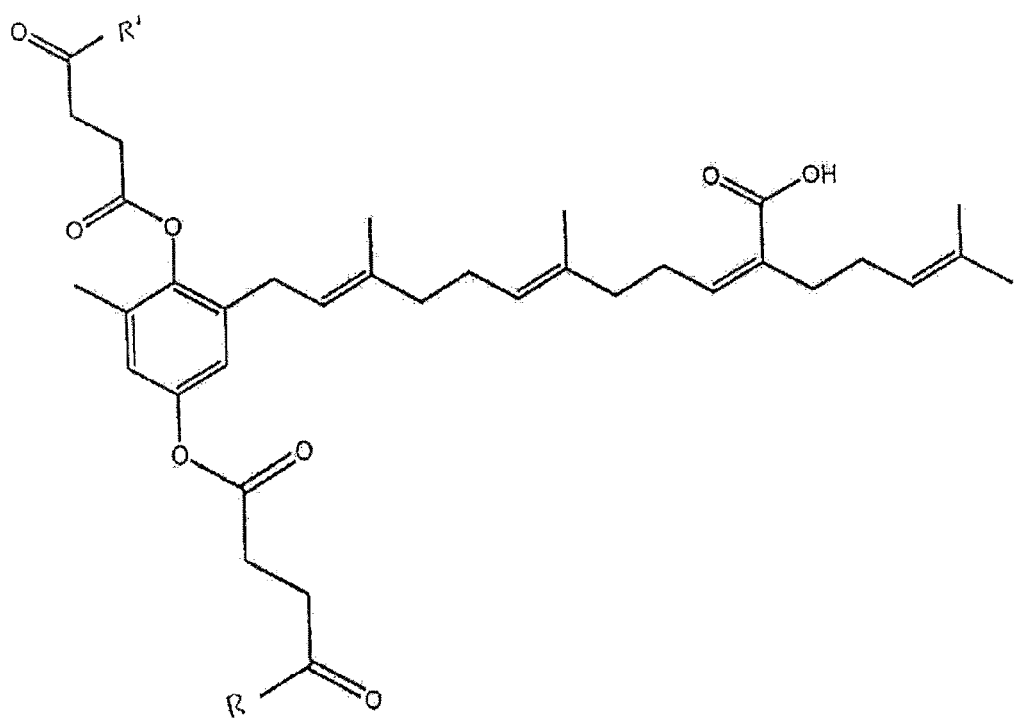
where R' is 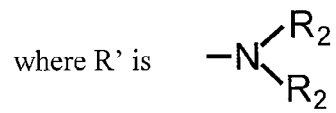
and $R_2$ can be either H or an alkyl group

KOMBIC ACID/SARGANOL BIS-SUCCINATE AND DERIVATIVES AS POTENT APOPTOGENS (ANTINEOPLASTIC AGENTS) WITH HIGH SELECTIVITY FOR CANCER CELLS

CROSS-REFERENCE TO RELATED APPLICATIONS

The present application is a continuation-in-part of U.S. patent application Ser. No. 10/780,052, filed Feb. 17, 2004 now U.S. Pat. No. 7,223,877, entitled "New Uses of Hydroquinone Substituted Polyunsaturated Fatty Acids as Antioxidants" by inventor Edward C. Leonard, which is a continuation-in-part of U.S. patent application Ser. No. 10/301,119, filed Nov. 21, 2002 by inventor Edward C. Leonard and now U.S. Pat. No. 6,713,512 entitled "New Uses of Kombic Acid as An Anti Cancer and Cholesterol-lowering Agent" which is a continuation-in-part of U.S. patent application Ser. No. 09/910,152 filed Jul. 19, 2001, by inventor Edward C. Leonard, and now U.S. Pat. No. 6,489,494 entitled New Use of Kombic Acid as an Antioxidant", the contents of all of which are incorporated by reference.

BACKGROUND OF THE INVENTION

1. Field of the Invention

The present invention relates to Kombic Acid derivatives as anti-cancer agents. More particularly, the present invention relates to kombic acid bis-succinate (also known as sarganol bis-succinate) and the corresponding alkyl and aryl derivatives as apoptogens with specificity for inducing apoptosis in cancer cells, both in vitro and in vivo. The present invention further relates to a method of synthesizing bis-succinate derivatives of sarganol, particularly for use as an anti-cancer agent.

2. General Background of the Invention

Kombic Acid was first isolated and characterized in 1983 (1). Subsequent work has shown that kombic acid, previously thought to have the structure shown in FIG. 1, was actually identical to several other compounds isolated from different sources and having different names (2). As a result, the chemical structure 12-(2,5-dihydroxy-3-methylphenyl)-6,10-dimethyl-2-(4-methyl-3-pentenyl)-2E,6E,10E)-2,6,10-dodecatrienoic acid has at least 3 common names, all of which refer to the structure shown in FIG. 2; Sarganol, Sargahydroquinoic Acid, and Kombic Acid. For the purposes of clarity, the name Sarganol will be used throughout this application.

Sarganol was isolated form the seedfat of a West African (Ghana, for example) tree called Pycnanthus Angolensis, also termed Pycnanthus Kombo. The seedfat, a vegetable butter, has become known as kombo butter. Two U.S. Patents have been obtained relating to the use of kombic acid in the treatment of coronary artery disease and neoplastic diseases. (3, 4) These patents disclose the antioxidative properties of kombic acid and show the superior antioxidative properties of kombic acid when compared to tocopherols (Vitamin E); generically, a molecule structurally similar to sarganol.

Fats and oils are water-insoluble, hydrophobic substances of vegetable, land animal or marine animal origin that consist mostly of glyceryl esters of fatty acids, called triglycerides. Their structure is shown below, where $R_1$, $R_2$, and $R_3$ can be the same or different —$(CH_2)_xCH_3$ chains, with x being an even number of 4 or greater.

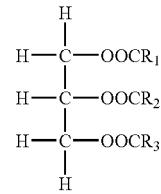

The chains (the Rs) may be completely saturated with respect to hydrogen or have one or more double bonds. When $R_1$ is seventeen carbons with no double bonds, the chain is called stearic; in this case there are thirty-five hydrogen atoms attached to the seventeen carbons. With one double bond the same carbon-length chain is called oleic and there are thirty-three attached hydrogen atoms. When there is more than one double bond, the fatty acids are polyunsaturated. Linoleic acid, for example, has eighteen carbons atoms and two double bonds, and linolenic acid has three double bonds and eighteen carbon atoms.

There are, annually, roughly 100 million metric tons of fats and oils consumed globally with about 80% used for human food. The balance is used as industrial oils; in animal feed; to make soap; and to produce oleochemicals, which have many industrial applications, most notably as plastics additives and food processing ingredients.

The principal fats and oils used in food are canola, soybean, palm, sunflower seed, coconut, palm kernel, sesame, olive, corn, cottonseed, edible tallow and lard. The most frequently occurring fatty acids found in these fats and oils are stearic ($C_{18:0}$), oleic ($C_{18:1}$), linoleic ($C_{18:1}$), linolenic ($C_{18:3}$), palmitic ($C_{16:0}$), myristic ($C_{14:0}$) and lauric ($C_{12:0}$). The first two digits in the carbon subscript refer to carbon chain length, and the number after the colon refers to the number of double bonds in the chain.

Myristoleic acid, which has fourteen carbon atoms and one double bond in the chain has an ester derivative, cetyl myristoleate, with claimed efficacy in relieving the pain of rheumatoid arthritis and osteoarthritis[1,2]. The myristoleic acid used to make this product up to now has been derived from beef tallow.

There are two commonly accepted reference sources with respect to published treatises on fats and oils: "Bailey's Industrial Oil and Fat Products" and Gunstone and Padley's, "Lipid Technologies and Applications." In "Bailey's" there is the following discussion of sources of myristoleic acid, all based on land animal or marine animal origin.

> 9-Tetradecenoic (myristoleic) acid is the most common of the tetradecenoic acids, being first detected in whale oil in 1925 at about 1.4%, later in whale blubber oil, in shark liver oil, Antarctic whale oil, eel oil, and turtle oil. In 1924 it was suggested that myristoleic acid occurs in butterfat; it was found to constitute 1% of the total acids. It also occurs in goat milk fat, human milk fat, and various animal depot fats, (particularly beef tallow).

It is noteworthy that there is not the slightest reference in Bailey's to any vegetable oil sources.

Gunstone and Padley, in their well-recognized reference work mention hundreds of fatty acids but make no reference of any sort to myristoleic acid. Useful products can be obtained from myristoleic acid, most notably cetyl myristoleate, a possible remedy for alleviating the pain and inflammation of arthritis and related maladies[1,2]. However, cetyl myristoleate based on myristoleic acid sourced from animal origins, up to now the only ostensible source, has several disadvantages:

1) Fatty acids derived from beef tallow run the risk, albeit slight, of inducing bovine spongiform encephalitis (mad-cow disease).

2) Any fatty acid sourced from land animal or marine animal origins cannot be Kosher or the Islamic equivalent, Halal.

3) Any fatty acids sourced from land animal or marine animal origins cannot be "vegetarian" or "vegetable-oil food-grade."

4) Fatty acids sourced from land animal and marine animal origins are identifiable by at least certain animals as having an undesirable taste and/or smell which negatively affects the ability of these animals to orally ingest supplements or drugs made with them.

Myristoleic acid, however, is not exclusively sourced from non-vegetable oil origins. There is a tree that produces a nut containing a vegetable butter that is a relatively good source of myristoleic acid[3,4,5,6]. The fat is known as kombo butter. It comes from the seeds of Pycnanthus Kombo (Myristicaceae family) found in West Central Africa. Other compounds isolated from P. Kombo (P. Angolensis) include 2'-hydroxy-4', 7-dimethoxy isoflavone and 2'-hydroxy fomonometin[8]. In addition, U.S. Pat. No. 5,674,900 00 describes the isolation and use of terpenoid quinones from the stems and leaves (not the seedfat) of P. kombo for use in treating diabetes[9].

The seedfat of P. kombo is reddish-brown and has a distinct aromatic odor. The fat also contains 20-30% of kombic acid. Sarganol is not a fatty acid per se, rather it is a substituted fatty acid, and must be separated and removed from kombo butter in manufacturing downstream oleochemical products such as myristoleic acid. From kombo butter, the unit operations to obtain relatively pure distilled fatty acid mixtures containing appreciable levels of myristoleic acid include: 1) fat (crude kombo butter) saponification to split the fat and form the sodium soaps of the fatty acids, thereby separating and removing the glycerine, 2) acidulation of the sodium soaps of the fatty acids to form the free fatty acids, and 3) molecular distillation of the crude fatty acids for purposes of purification. The cetyl esters can then be formed by conventional esterification reactions. The present invention describes bis-succinate derivatives of sarganol isolated from the seed fat of Pycnanthus Kombo and their use as potent antineoplastic agents with selectivity for cancer cells.

BRIEF SUMMARY OF THE INVENTION

The present invention provides bis-succinate derivatives of sarganol and their use as potent apoptogenic antineoplastic agents with selectivity for cancer cells.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein:

FIG. 1 shows the initial, but erroneous, structural identification of kombic acid (1), also known as the hydroquinone polyisoprenoic carboxylic acid 2,6,10,14-Hexadecatrienoic acid, 16-(2,5-dihydroxy-3-methylphenyl)-2,6,10,14-tetramethyl-,(2Z,6E,10E,14E)-(9CI);

FIG. 2 shows the structure of sargahydroquinoic acid, also known as 2,6,10-Dodecatrienoic acid, or 12-(2,5-dihydroxy-3-methylphenyl)-6,10-dimethyl-2-(4-methyl-3-pentenyl)-, (2E,6E,10E)-(9CI), or sarganol, or the corrected structure of kombic acid;

FIG. 3 shows the structure of the bis-succinate derivatives of sarganol useful in the present invention; and FIG. 4 shows the structure of the succinate amide ester derivatives useful in the present invention.

DETAILED DESCRIPTION OF THE INVENTION

Example 1

Preparation of Bis-Succinate Derivatives of Sarganol

The general procedure for preparation of the bis-succinate derivative of sarganol, yielding >99% purity, is as follows. To a stirred solution of 3 g (7 mmol) sarganol in 100 mL dichloromethane ($CH_2Cl_2$), 10 mL (7.3 g, 72 mmol) of triethyl amine was added, followed by 7.2 g (72 mmol) of succinic anhydride. This dark mixture was stirred under $N_2$ for 18 hr. The reaction was then poured into 3N HCl, extracted with dichloromethane ($CH_2Cl_2$), and washed with water and brine. Water was added and the mixture stirred overnight to remove excess succinic anhydride. The water was decanted and the organic layer was dried over $Na_2SO_4$. The mixture was filtered and solvent removed in vacuo leaving a dark oil. The oil was chromatographed on silica (3:1 hexane:EtOAc 0.5% acetic acid) and solvent was removed in vacuo leaving a light yellow oil. The oil was dissolved in $CH_2Cl_2$ and layered with hexane. After sitting overnight the resulting white precipitate was filtered and dried under vacuum leaving 1.1 g of white solid. This was >99% pure by 215 nm HPLC. Melting point was between 82° C. and 84° C. The resulting material, sarganol bis-succinate is an ideal candidate for biological assay. It is a white crystalline solid, having a sharp melting point and is highly pure.

The alkyl and aryl esters of the bis-succinate are made by conventional, well-known organic synthesis techniques.

Example 2

Cytotoxicity Analysis

Cells treated with sarganol bis-succinate and sarganol bis-succinate derivatives show increased cytotoxicity compared to untreated cells.

Tissue cultures cells are plated in a 96-well flat-bottom tissue culture plate (or any other appropriate tissue culture plate as desired). Cells are allowed to attach overnight, then incubated for a specified time with individual sarganol analogues. These analogues are dissolved in ethanol and diluted in complete DMEM to the final concentration desired and added to the cells. Cell viability is determined, by, for example, using the MTT assay. Briefly, following exposure of cells, 10 µl of MTT (5 mg/ml in PBS) is added, and after incubation for a specified time at 37° C., the medium is removed and combined with detergent (200 µl of 1% SDS). Absorbance is read at 550 nm using an ELISA plate reader and background absorbance is considered as 100%. Survival curves are generated and the $IC_{50}$ values determined.

Example 3

Assessment of Apoptotic Markers

Increased apoptosis is and/or mitochondrial destabilization is seen when cells are treated with sarganol bis-succinate, and sarganol bis-succinate derivatives compared to their untreated counterparts.

Apoptosis is quantified using, for example, the annexin V-FITC method, or any other method known to those of skill in the art. The V-FITC method detects phosphatidyl serine (PS) externalized in the early phases of apoptosis. Briefly, treated cells are collected, washed, and resuspended in 0.1 ml of binding buffer (10 mM HEPES, 140 mM NaCl, 5 mM $CaCl_2$, pH 7.4), incubated for 20 min at room temperature with 2 µl annexin V-FITC (PharMingen), supplemented with 10 µl of propidium iodide (PI; 10 µg/ml) and analyzed by flow cytometry.

Mitochondrial destabilization is assessed by flow cytometric evaluation of the mitochondrial inner transmembrane potential ($\Delta\Psi m$), using the polychromatic probe 5,5',6,6'-tetrachloro 1,1',3,3'-tetrahylbenzimidoazolyl-carbocyano iodide (JC-1). JC-1 accumulates in highly energized mitochondria with $\Delta\Psi m \geq -110$ mV, giving strong red fluorescence. Upon dissipation of $\Delta\Psi m$, JC-1 leaks into the cytosol, where it yields green fluorescence. In brief, treated cells are collected, washed, incubated with JC-1 in DMSO and assessed for increase of green fluorescence in a flow cytometer.

Example 4

Flow Cytometric Assessment of Protein Expression

Cells are treated as indicated, harvested, fixed with formalin in PBS and permeabilized with saponin in PBS containing 2% FBS. Cells are then exposed to anti-Bcl-2, anti-Bcl-XL, anti-Mcl-1, and anti-Bax IgG, followed by an FITC-conjugated secondary antibody. The level of protein expression is estimated by analyzing the cells with a flow cytometer.

Overexpression of both antiapoptotic proteins suppresses susceptibility of the mesothelioma cells to sarganol bis-succinate and the sarganol bis-succinate derivatives. The level of expression of Bcl-2, Bcl-XL, Mcl-1 and Bax in Jurkate cells exposed to sarganol, sarganol bis-succinate, and sarganol bis-succinate derivatives for the time at which lower extents of apoptosis are detected for most of the agents used can be assessed. Expression of none of the proteins assessed for is significantly altered by the treatment suggesting that sarganol, sarganol bis-succinate, and sarganol bis-succinate derivatives do not induce apoptosis by changing the ratio of the anti-apoptotic vs. the proapoptotic Bcl-2 family proteins. This data, together with the data showing dissipation of the $\Delta\Psi m$ suggest mitochondrial involvement in apoptosis signaling of the sarganol bis-succinate, and sarganol bis-succinate derivatives.

Example 5

Apoptogenic Propensity of Sarganol Bis-Succinate In Vivo

Sarganol analogues are effective in inducing apoptosis in vivo. An investigation of the apoptogenic propensity of sarganol bis-succinate and the alkyl and aryl derivatives using several cell lines, including, but not limited to the human T-lymphoma Jurkat cells, the leukemic U937 cells and the malignant mesothelioma Meso-2 cells demonstrates that these compounds are effective in inducing apoptosis in vivo. Cells are incubated in the presence or absence of the sarganol analogues and assessed for appropriate apoptogenic markers. Sarganol analogue-treated cells show more apoptosis markers than their untreated counterparts.

Example 6

In Vitro Studies of Sarganol Bis-Succinate and Sarganol Bis-Succinate Alkyl and Aryl Derivatives Sarganol bis-succinate, and the sarganol bis-succinate alkyl and aryl derivatives are inducers of apoptosis for a variety of malignant cell lines, including, but not limited to lymphoma, leukemia, and mesothelioma cell lines, as well as breast cancer and colon cancer cells.

Sarganol bis-succinate and sarganol bis-succinate alkyl and aryl derivatives inhibit the growth of human breast cancer cells in a dose-dependent manner. MDA-MB-231 and MCF-7 or other human breast cancer cells are grown to an appropriate density, such as 50-70% confluence. They are then harvested, and replated in plates at a density of about $1 \times 10^5$ cells/well. Cells are incubated for a specified time, such as 24-72 hours in media containing sarganol bis-succinate, a sarganol bis-succinate derivative, media, or a "no addition" control. Cell number and viability are determined with methods known to those of skill in the art, such as, but not limited to, hemacytometer or trypan blue exclusion analysis. Cell survival and proliferation are inhibited by the sarganol compounds in both a dose- and a time-dependent manner.

A Cell Death Detection ELISA using human breast cancer cells such as MDA-MB-231 or MCF-7 cell lines can also be performed. Sarganol bis-succinate and sarganol bis-succinate derivatives stimulate apoptosis in a dose- and/or time-dependent manner.

Sarganol bis-succinate, and sarganol bis-succinate derivatives inhibit growth and promote apoptosis in melanoma in vitro. Dose-response studies on proliferation and apoptosis of melanoma cells, such as B16F10 (murine melanoma cells), in vitro show the effects of sarganol bis-succinate and sarganol bis-succinate derivatives on melanoma cancer growth. Cells are grown to a specified confluence, such as 50-70% confluence, and harvested. Cell number is determined, for example, with a hemacytometer and by trypan blue exclusion analysis. Cells are replated, for example, in 96-well plates and incubated in media containing sarganol, sarganol bis-succinate, a sarganol bis-succinate derivative, vehicle, and a "no addition" control. Cell proliferation activity is determined by, for example, a colorimetric MTS assay. The sarganol and derivative compounds inhibit the proliferation of melanoma cells in vitro in a dose-dependent manner A malignant mesothelial cell lines such as Ist-Mes2 (epithelioid) human MM cell line and a nonmalignant mesothelial cell line such as Met-5A are grown in media such as DMEM supplemented with, for example, antibiotics and 10% FCS. Cells are seeded, for example in 24-well plates and left to reach, for example, 60-70% confluence. They are then treated with media, no additions, sarganol bis-succinate, or a sarganol bis-succinate derivative and assessed for apoptosis. Assessment for apoptosis can include using the annexin V assay. Annexin V-FITC binding is estimated by flow cytometry. Sarganol bis-succinate, and sarganol bis-succinate derivatives induce apoptosis in the malignant mesothelial cell lines, but are nontoxic to the nonmalignant mesothelial cell lines.

Example 7

In Vivo studies of Sarganol Bis-Succinate and Sarganol Bis-Succinate Derivatives CT-26 murine colon cancers cells treated with sarganol bis-succinate, or sarganol bis-succinate alkyl or aryl derivatives in vitro inhibit proliferation of CT-26 cells in a dose-dependent manner. Treatment of CT-26 colon cancer cells with these same compounds shows a dose-dependent increase in apoptosis.

Nude mice, with established HCT116 cell-induced tumors, treated with sarganol bis-succinate or sarganol bis-succinate derivatives show a reduction in the number of liver metastases per mouse compared with the control (DMSO) treated cells.

Splenic injection allows for spillage of some of the tumor cells into the peritoneal cavity. Treatment with sarganol bis-succinate or sarganol bis-succinate derivatives prevents disseminated carcinomatosis compared to DSMO controls.

Immunostained sections of livers from DMSO (control) and the sarganol bis-succinate, or sarganol bis-succinate derivatives groups can be analyzed for anti-proliferative effects. Performance of PCNA (proliferating cell nuclear antigen) shows a decrease in cell proliferation in mice treated with sarganol, sarganol bis-succinate or the sarganol bis-succinate derivatives compared to the control DMSO treated group. Immunostained sections from the DMSO group and the sarganol bis-succinate and sarganol bis-succinate derivative group show differences in apoptosis; specifically an increase in apoptosis in mice treated with the test compounds compared to the control DMSO treated group.

HCT116 cell-derived xenografts treated with sarganol bis-succinate and sarganol bis-succinate derivatives result in inhibition of tumor volume growth. Histological analysis does not reveal signs of toxicity of these compounds on the heart, liver, kidney, jejunum, or colon suggesting that the in vivo cytotoxic effect of sarganol bis-succinate and sarganol bis-succinate derivatives is selective for tumor cells without adverse effects on organs or proliferating cells in the intestinal crypts. Cultured colonocytes, in contrast to HCT116 cells, are resistant to sarganol bis-succinate-induced and sarganol bis-succinate derivative-induced apoptosis.

Sarganol bis-succinate and its derivatives have a rapid turnover in vivo. To develop a dosing regimen for its retention in vivo, the pharmacokinetics of the sarganol compounds in mice injected with these compounds is examined by analyzing plasma levels of sarganol bis-succinate (or its derivatives) and its hydrolysis product. Observing peak levels obtained as a function of time determines the proper dosing regimen that would allow high plasma levels to be reached and maintained.

Athymic nude mice are implanted with MDA-MB-231 cells, or other breast cancer cells shown to be susceptible to sarganol bis-succinate or sarganol bis-succinate derivatives in vitro. Tumors are allowed to grow. They are then divided into various treatment groups after tumors reach an appropriate volume. The treatment groups include a control ip (ip injection of vehicle), sarganol bis-succinate ip (ip injection of sarganol bis-succinate), a sarganol bis-succinate derivative ip (ip injection of a sarganol bis-succinate derivative), control sc (sc injection of vehicle), sarganol bis-succinate sc (sc injection of sarganol bis-succinate), and/or a sarganol bis-succinate derivative sc (sc injection of a sarganol bis-succinate derivative). Tumors in the control groups grow rapidly. Inhibition of tumor growth is seen in the groups treated with the sarganol bis-succinate or the sarganol bis-succinate derivative.

Athymic nude mice allografted with melanoma cells such as B16F10 murine melanoma cells are divided into control and sarganol-treated groups. Tumor growth is monitored. Tumors in the control group grow rapidly, while those in the sarganol bis-succinate and sarganol bis-succinate derivative groups are inhibited. Immunostained sections from control- and sarganol bis-succinate- and sarganol bis-succinate derivative-treated groups of animals show that inhibition of tumor growth results from the stimulation of apoptosis. Apoptotic effects on melanoma tumors are analyzed by in situ cell death detection ELISA. Apoptosis is detectable by morphologic findings, chromatin condensation, nuclear DNA fragmentation, DNA strand breakage, or apoptotic bodies. Melanoma tumors from treated mice demonstrate an increase in apoptosis compared with those from the control group.

Immunocompromised (athymic) hairless mice are injected with human malignant mesothelioma cells (such as Ist-Mes2). Mice are inoculated with cells then left so that peritoneal mesotheliomas can establish. Control mice are kept untreated. Treated mice are injected with sarganol bis-succinate or a sarganol bis-succinate derivative. Doses are determined by effective doses obtained in similar in vitro studies on cell lines. Tumors in control mice continue to grow and can result in the death of the mice. In contrast, treated mice show a significantly extended life span indicating that treatment with sarganol bis-succinate or a sarganol bis-succinate derivative can increase the survival of mice with experimental human peritoneal mesothelioma.

Example 8

Specificity of Sarganol Bis-Succinate, and Sarganol Bis-Succinate Derivatives for Apoptotic Activity in Malignant Cells Versus Non-Malignant Cells Based on the heretofore previously unrecognized structural similarities between Vitamin E analogues and sarganol analogues, the present invention demonstrates the specificity of sarganol analogues to induce apoptosis in malignant cells similar to the Vitamin E analogues. Minimal apoptosis is caused by the sarganol bis-succinate and sarganol bis-succinate derivatives in human fibroblasts, a cell line most closely associated with normal cells. However, apoptosis is induced by sarganol bis-succinate, and sarganol bis-succinate derivatives in a variety of malignant cell lines. Thus, similar to the Vitamin E derivatives, sarganol bis-succinate and its derivatives also appear to be malignant cell specific. This has important implications for cancer treatment in humans, as these analogues have the ability to induce effective apoptosis in cancer cells with high selectivity, causing low or no toxicity toward normal cells and tissues.

Example 9

Effect of Sarganol Bis-Succinate and Sarganol Bis-Succinate Derivatives on Mitochondrial Apoptosis Induction Based on the previously unrecognized structural similarities, it is possible that the mitochondria are implicated in the apoptosis induction by sarganol bis-succinate and sarganol bis-succinate derivatives. Previous studies have documented that overexpression of the antiapoptotic proteins Bcl-$x_L$ and Bcl-2 protects cancer cells from alpha-tocopherol succinate (α-TOS). Meso-2 cells are stably transfected with plasmids harboring the Bcl-$x_L$ or Bcl-2 genes fused to the gene coding for EGFP. The cells are also transfected with plasmids carrying a gene in which the mitochondrial-docking N-terminus of Bcl-$x_L$ and Bcl-2 is deleted, since mitochondrial association of Bcl-$x_L$ and BCl-2 is a prerequisite for their anti-apoptotic affect. Overexpression of both anti-apoptotic proteins suppresses susceptibility of the mesothelioma cells to the sarganol compounds. This is not observed when ΔBcl-XL or ΔBcl-2 is used.

To address whether sarganol bis-succinate and/or sarganol bis-succinate derivatives regulate expression of Bcl-2 family proteins, the level of expression of Bcl-2, Bcl-$x_L$, Mcl-1 and Bax in Jurkat cells are exposed to the sarganol compounds individually for an amount of time at which lower extent of apoptosis is detected for most of the agents used. Expression of none of the proteins assessed for is significantly altered by the treatment suggesting that the sarganol compounds do not induce apoptosis by changing the ratio of the anti-apoptotic vs. the proapoptotic Bcl-2 family proteins.

REFERENCES

1. Lok, C. M., Groenewegen, A., Stroink, B. A., and Ward, J. P. *Phytochemistry* 22(9) 1973-1976 (1983).
2. Sassano, Gary, Davis, Adrienne, L., and Joseph, Alison, "Structural Identification of Sargahydroquinoic Acid, a Polyisoprenoic Acid Isolated from *Pycnanthus angolensis* (Kombo Nuts), ChemComm submitted.
3. U.S. Pat. No. 6,713,512, Edward C. Leonard, March, 2004.
4. U.S. Pat. No. 6,489,494, Edward C. Leonard, December 2002.
5. Tomic-Vatic, Adisa, EyTina, John, Chapman, James, Mahdavian, Elahe, Neuzil, Jiri, and Salvatore, Brian A. "Vitamin E Amides, A New Class of Vitamin E Analogues with Enhanced Proapoptotic Activity", Int. J. Cancer: vol. 117, 188-193 (2005).

The foregoing embodiments are presented by way of example only; the scope of the present invention is to be limited only by the following claims.

What is claimed is:

1. A method of treating cancer cells with an effective amount of sarganol bis-succinate.

2. A method of treating cancer cells with an effective amount of a derivative of sarganol.

3. The method of claim 2, wherein said derivative of sarganol is selected from the group consisting of sarganol bis-succinate, alkyl esters of sarganol bis-succinate, and aryl esters of sarganol bis-succinate.

4. The method of claim 2, wherein said derivative of sarganol is sarganol bis-succinate.

5. The method of claim 2, wherein said derivative of sarganol has the general formula:

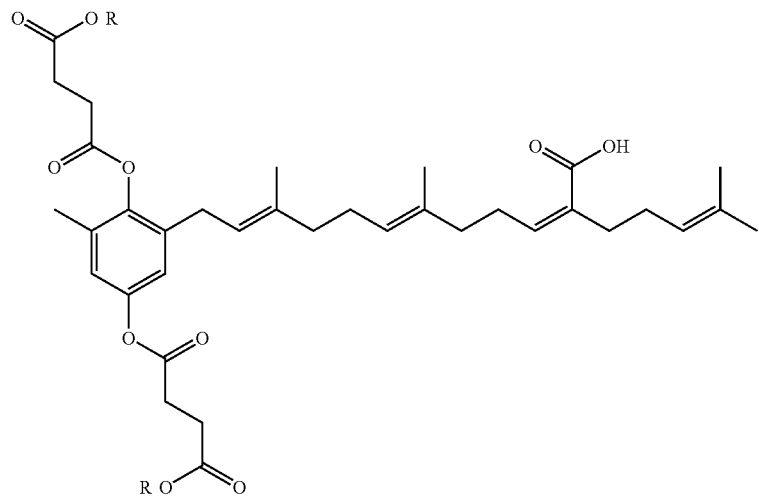
where R can be H, an alkyl group, or an aryl group.
6. The method of claim 5, where R is H.
7. The method of claim 5, where R is an alkyl group.
8. The method of claim 5, where R is an aryl group.
9. The method of claim 5, where R is $CH_3$.
10. The method of claim 5, wherein said derivative of sarganol is the dimethyl ester of the bis-succinate of sarganol, where R is a methyl group.
* * * * *